United States Patent [19]
Navarre

[11] Patent Number: 6,093,015
[45] Date of Patent: Jul. 25, 2000

[54] MOLD CORE POSITIONING DEVICE

[75] Inventor: Lawrence J. Navarre, Leonard, Mich.

[73] Assignee: D-M-E Company, Madison Heights, Mich.

[21] Appl. No.: 09/227,846

[22] Filed: Jan. 11, 1999

[51] Int. Cl.[7] .................................................. B29C 45/40
[52] U.S. Cl. .................... 425/556; 264/318; 425/DIG. 5; 425/DIG. 58
[58] Field of Search ............................ 264/318; 425/556, 425/577, DIG. 5, DIG. 58

[56] References Cited

U.S. PATENT DOCUMENTS

| | | | |
|---|---|---|---|
| 2,481,648 | 9/1949 | Dehn | ........................................... 235/61 |
| 3,060,509 | 10/1962 | McCubbins, Jr. . | |
| 3,266,098 | 8/1966 | Bucy . | |
| 3,387,323 | 6/1968 | Wyllie et al. . | |
| 3,811,845 | 5/1974 | Feist | ................ 425/DIG. 58 |
| 4,515,342 | 5/1985 | Boskovic | ................ 249/122 |
| 4,889,480 | 12/1989 | Nakamura et al. | ..................... 425/577 |

*Primary Examiner*—Tim Heitbrink
*Attorney, Agent, or Firm*—Stephen H. Friskney

[57] ABSTRACT

A mold core positioning device includes a cam member carried by a first mold segment that is configured to engage a cam follower carried by a second, cooperating mold segment. The cam follower is provided on a core slide to which an outwardly extending core member, such as a core pin, is connected. The core slide is movable toward and away from a mold cavity to move the core pin into and out of a position within the mold cavity. The cam member includes an extension cam surface and a withdrawal cam surface. The withdrawal cam surface includes a breakaway cam surface that causes slow retraction of the core pin relative to the molded part, and a retraction cam surface that causes more rapid withdrawal of the core slide and core pin after the core pin has been initially separated from the molded part.

12 Claims, 4 Drawing Sheets

MOLD CORE POSITIONING DEVICE

BACKGROUND OF THE INVENTION

1. Field of the Invention

The present invention relates to a mold core positioning device that is operable to position a core member in a mold cavity defined by a pair of moveable mold segments. More particularly, the present invention relates to a mold core positioning device that operates automatically to extend a core member into a mold cavity as the mold is closed, and to retract the core member from the mold cavity as the mold is opened.

2. Description of the Related Art

Core members of various types and configurations are provided in mold constructions to form apertures, recesses, and the like, in molded parts. Typically, core members extend fully or partially into a mold cavity to help define the final geometry of the molded part. In some mold constructions, the core members remain stationary with respect to the mold cavity throughout the molding cycle. Alternatively, a mold can include a core member that is movable with respect to the cavity to enable the formation of elements that are not compatible with the direction of mold separation. These movable cores can be positioned by a dedicated actuator or they can be configured as to automatically insert and retract a core member relative to a mold cavity at an appropriate time in the molding cycle.

One form of automatically operated mold core positioning apparatus is disclosed in U.S. Pat. No. 3,060,509, which issued on Oct. 30, 1962, to J. T. McCubbins, Jr. That apparatus includes a plurality of core pins that are adapted to be inserted automatically into and to be withdrawn from the mold cavity. Each core pin is carried in a first mold portion and has an engaging shank that includes grooves that are engageable by a respective slide member. The slide members include first and second inclined cam surfaces that are received in and are engageable with the shank grooves. The slide members are carried by a second mold portion and are moved relative to the grooves in the engaging shanks as the mold portions are moved into engagement to selectively move the core pins into the mold cavity as the mold closes, and also to retract the core pins from the mold cavity after the molding material has been injected into the mold cavity, allowed to cool, and the mold is opened. The slide members are spring biased so that when the mold segments separate, the springs urging the slide bars in a direction to cause the core pins to be retracted from the mold cavity, to thereby enable the molded part to be withdrawn from the mold.

Although the McCubbins, Jr. device is operable to control automatically the movement of the core pins, it has a complicated structure that requires considerable machining of each of the mold segments in order to properly accommodate the springs, the slide bars, and the associated slide members. Additionally, the device as disclosed operates to provide a sudden and continuing constant retraction force to the core pin throughout the retraction phase of the molding cycle, and a substantially constant extension force during the core pin extension phase of the molding cycle.

SUMMARY OF THE INVENTION

It is an object of the present invention to provide an improved mold core positioning device that has a simple structure and does not require springs.

It is another object of the present invention to provide a mold core positioning device that positively extends and retracts a core member to and from a mold cavity without requiring extensive machining steps in order to enable the mold segments to accommodate the elements of the device.

It is a still further object of the present invention to provide a mold core positioning device that provides a variable core member retraction force, which varies the retraction speed and thereby minimizes potential damage to the molded part upon initial separation of the core member from the molded part. This varying retraction speed makes the mold core positioning device more durable to ensure reliable operation for a variety of application requirements.

In accordance with one aspect of the present invention, a mold core positioning device is provided that includes a cam member adapted to be carried by a first mold segment. The cam member has a first cam surface that defines a core member extension cam surface that includes a first, core extension cam surface, and a second, core locking cam surface. The cam member also has a second cam surface that defines a core member withdrawal cam surface that includes a first, core breakaway cam surface, and a second, core retraction cam surface. The core breakaway cam surface is inclined relative to the mold opening and closing movement direction at a first acute angle, and the core retraction cam surface extends from the core breakaway cam surface and is inclined relative to the mold opening and closing movement direction at a second acute angle. The second acute angle is greater than the first acute angle.

A core slide is carried by a second mold segment for sliding movement toward and away from a mold cavity that is defined by the first and second mold segments. A core member is supported by the core slide for selective extension into and retraction from the mold cavity by the core slide. The core slide has first and second cam follower surfaces that are configured to engage the first and second cam surfaces, respectively, of the cam member.

Movement of the mold segments into cooperative engagement causes the core slide to be moved by the core extension cam surface toward the mold cavity, causing the core member to extend into the mold cavity. As the mold reaches a fully closed position, the core locking cam surface acts to hold securely the core slide in position during the subsequent injection of molding material. Upon mold retraction, the core breakaway cam surface cooperates with the second cam follower surface to withdraw the core member from the mold cavity at a first speed relative to the mold cavity. After breakaway, and upon continued movement of the mold segments away from each other, the core retraction cam surface cooperates with the second cam follower surface to fully withdraw the core member from the mold cavity at a second speed relative to the mold cavity, the first speed being less than the second speed to effect initial, relatively slow withdraw of the core member from the mold cavity to effect initial separation of the core member from the molded article without damaging the molded article, and to effect subsequent more rapid withdrawal of the core member after initial separation of the core member from the molded article has been accomplished.

DESCRIPTION OF THE PREFERRED EMBODIMENTS

Figure 1:
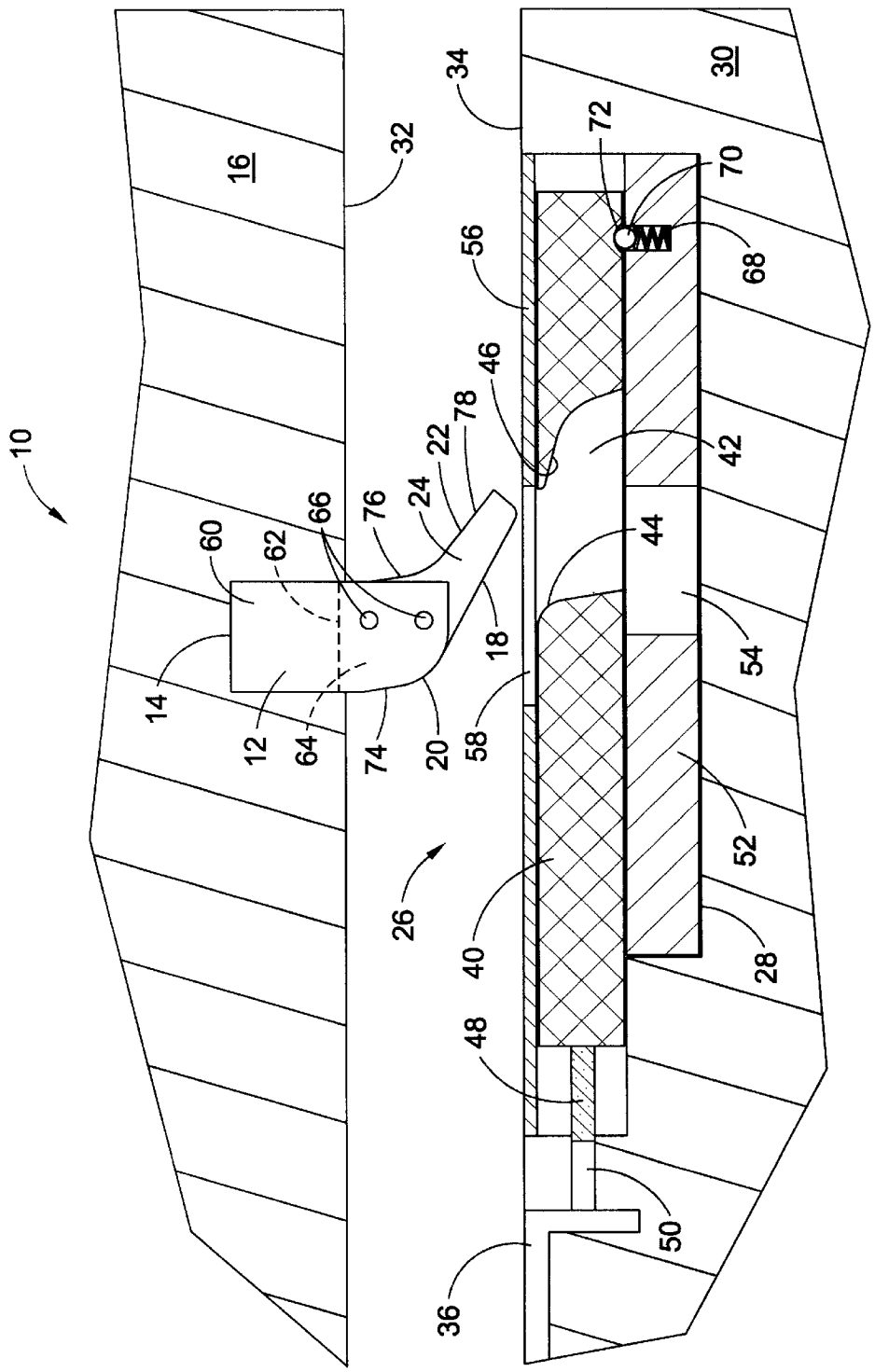
FIG. 1 is a side cross-sectional view of a mold core positioning device in accordance with the present invention.
Figure 2:
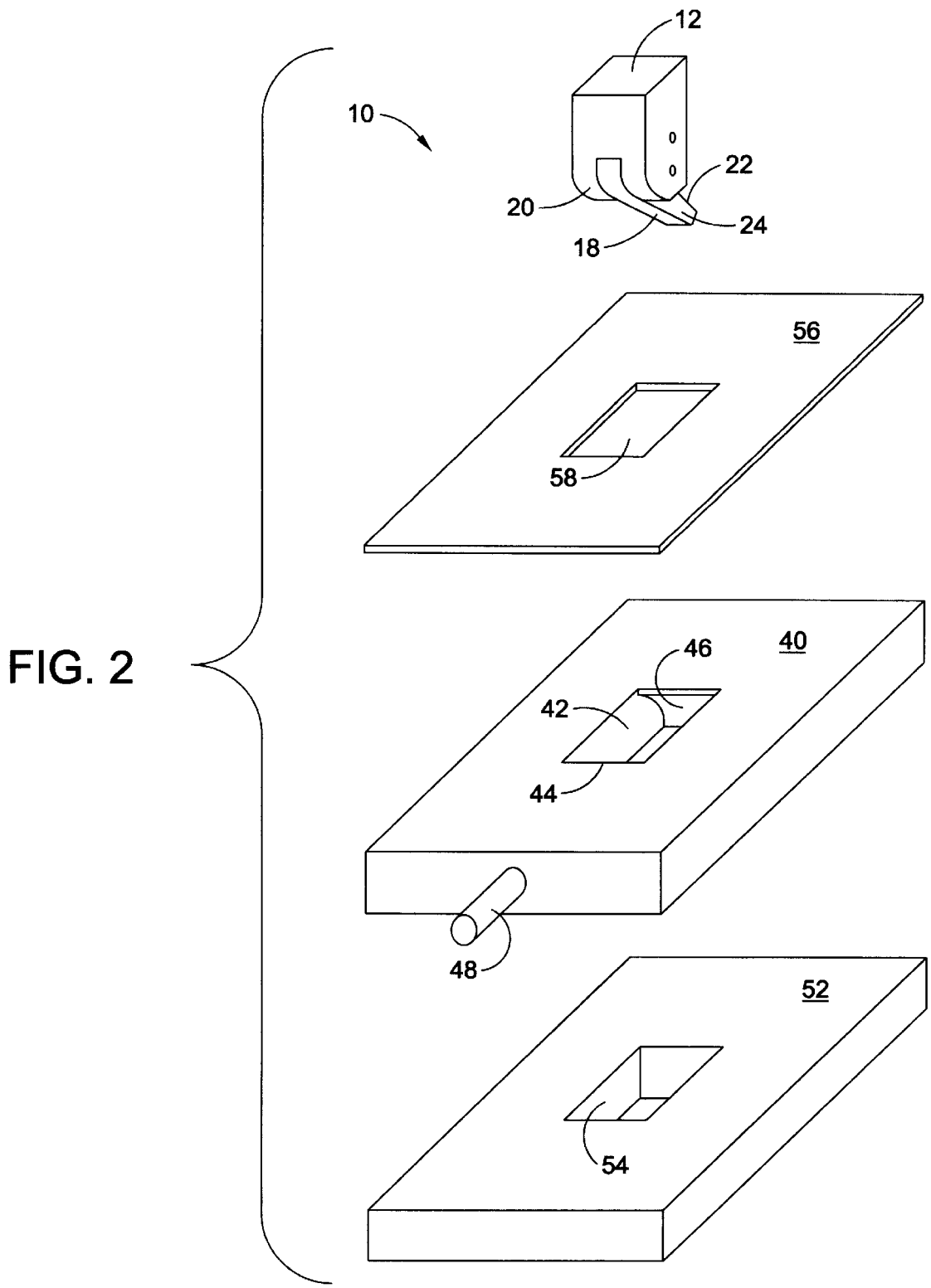
FIG. 2 is an exploded view of the mold core positioning device shown in FIG. 1.

Referring now to the drawings, and particularly to FIGS. 1 and 2 thereof, there is shown a mold core positioning device 10 in accordance with the present invention. The positioning device 10 includes a cam holder 12 that can be a substantially rectangular block, as shown, and that is adapted to be received in a cam holder recess 14 formed in a first mold segment 16. The cam holder 12 includes a first cam surface 18 that is formed at a lowermost rounded edge 20 of the cam holder 12 for core member extension. The cam holder 12 also includes a second cam surface 22 that is formed on an extension 24 of the cam holder 12 for core breakaway and retraction.

A sliding core assembly 26 is positioned within a recess 28 that is formed in a second mold segment 30. The first and second mold segments 16, 30 are so configured that when their respective facing surfaces 32, 34 are brought into contact, they cooperate to define a mold cavity 36 that is adapted to be filled with material to define a molded part 38. The several parts as they are shown in FIG. 1 represent the relative positions of the parts when the first and second mold segments 16, 30 are spaced from each other.

The core assembly 26 includes a core slide 40 that is carried in the recess 28 for sliding linear movement toward and away from the mold cavity 36. As best seen in FIG. 2, the core slide 40 is a generally rectangular structure that includes a cam-receiving opening 42 to receive the cam holder extension 24 and the cam holder 12 during the course of a molding cycle. The cam-receiving opening 42 includes at an edge thereof a first cam follower surface 44 and a second cam follower surface 46. In terms of the mechanical movement, the cam holder 12 with its extension 24 of can be characterized as a "wiper" that intermittently engages the cam surfaces 44, 46 of the core slide 40 as the mold closes and opens.

As explained in greater detail below, the first cam follower surface 44 is intended to engage with the first cam surface 18 to extend a core member, such as the core pin 48, and the second cam follower surface 46 is intended to engage with second cam surface 22 to retract the core pin 48. The pin 48 extends from one end of the core slide 40, in a direction toward the mold cavity 36, and it is slidably axially received within a core pin guide 50 that extends from the recess 28 to the mold cavity 36. Although, a generally cylindrical core pin 48 is illustrated in the drawings, it will be apparent to those skilled in the art that core members having different configurations can be provided, as may be required for the geometry of a molded part.

Positioned below the core slide 40 within the recess 28 is a base plate 52 on which the core slide 40 is adapted to rest and to slide between a core extended position and a core retracted position. The base plate 52 can also be of a rectangular configuration, as best seen in FIG. 2, and also includes a cam-receiving opening 54 to receive a portion of the cam holder extension 24 during a core extension phase of an operating cycle. In some mold constructions, it may be desirable to make the core slide 40 of sufficient thickness to match the distance that the cam holder 12 and extension 24 extend beyond the mold surface 32. For such a case, the base plate 52 could be eliminated from the core assembly 26, so that the core slide 40 rests on the bottom of the recess 28.

Positioned above the core slide 40 is a cover plate 56, which is adapted to contain the core slide 40 within the recess 28, and to be received within a correspondingly shaped opening formed in the uppermost surface 34 of the second mold segment 30. The cover plate 56 also has a cam-receiving opening 58 that is of a sufficient size to permit the cam holder extension 24 to extend therethrough during the course of core extension and retraction as occurs during a molding cycle.

Although the core assembly 26 has been illustrated and described in the context of a three part structure, if desired, the core assembly 26 can be a unitary member defined solely by a core slide that is received and retained in a suitably shaped recess formed in the surface of the second mold segment. Depending on the relative geometries of the core slide 40 and the cam holder 12 and extension 24, the second mold segment may need to include a suitable opening or recess below core slide 40 to receive cam holder extension 24 as the mold segments are brought together into contacting relationship.

The cam holder 12 can be provided as a single piece structure, or it can include a cam holder block 60 as shown in FIGS. 1 and 2. The block 60 can include a slot 62, or the like, to receive a separate cam member 64 that is securely attached to the block 60 by means fasteners 66, that can be bolts, pins, rivets, or the like. Providing the cam member 64 as a separate element permits differently shaped cam surfaces to be provided thereon for attachment to the cam holder block 60. The cam surfaces can be specifically shaped to accommodate the operating requirements of differently shaped core members in differently shaped mold cavities with different core extension and retraction times and speeds.

If desired, a retaining device can be provided to retain the core slide in a retracted position, as shown in FIG. 1. In that regard, the base plate 52 can include a suitable recess to receive a spring 68 and a ball 70 that is spring-loaded to allow a portion of the ball 70 to extend above the uppermost surface of the base plate 52. A suitably shaped detent recess 72 is provided in the lowermost surface of the core slide 40, that faces the base plate 52, so that when the core slide 40 is in its fully retracted position, the ball 70 is partially received within the detent recess 72 to retain the core slide 40 in the retracted position until extension of the core pin 48 is desired and is initiated by the cam holder 12. Such a retention arrangement is particularly useful when the core slide parts are oriented so that the core slide moves in either a vertical direction or a direction that is inclined to the horizontal, and wherein some holding force is desired to hold the core slide in its retracted position until ready for an extension operation.

Figure 3:
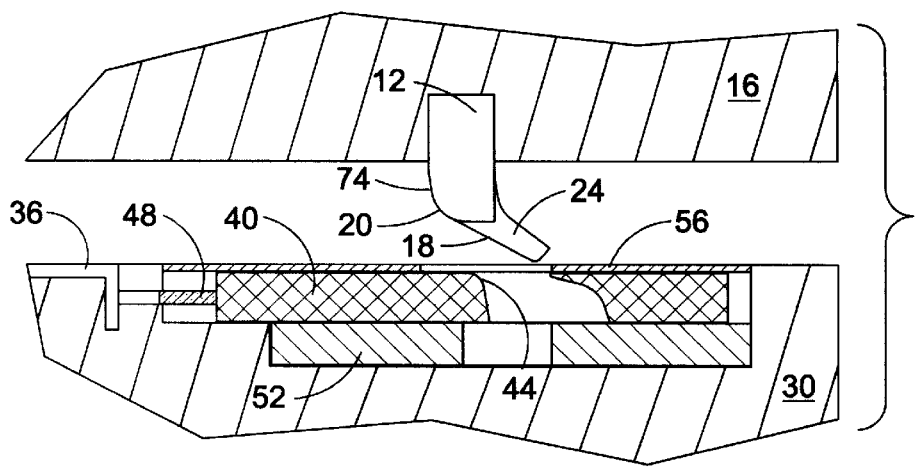
FIGS. 3 through 6 show the mold core positioning device at various positions during a mold closing sequence.
Figure 4:
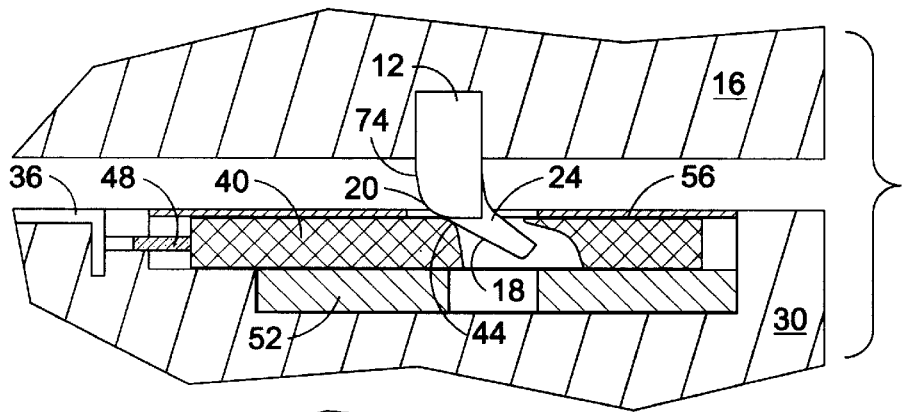
Figure 5:
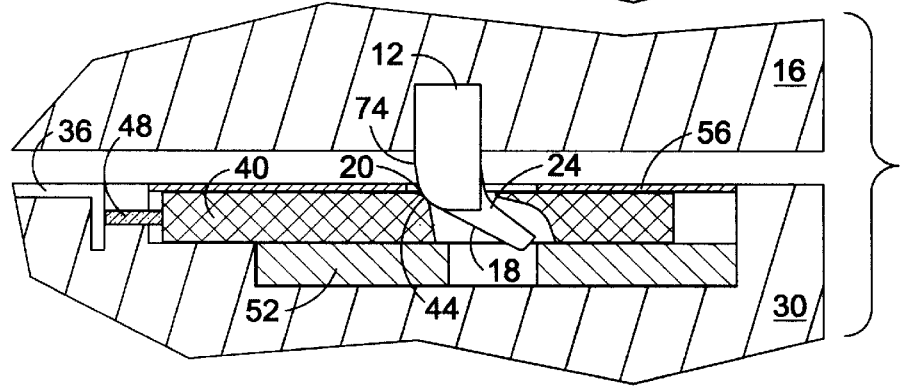

The operation of the mold core positioning device 10 during a mold closing sequence is illustrated in FIGS. 3 through 6. FIG. 3 shows the parts with the mold segments 16, 30 in an opened position, with the cam extension 24 disengaged from the core slide 40, the core pin 48 fully retracted from the mold cavity 36, and the core slide 40 in its most distant position relative to the mold cavity. As the mold segments 16, 30 are moved toward each other to the position shown in FIG. 4, the cam member 64 extends through the cam-receiving opening 58 in the cover plate 56 and into the cam-receiving opening 42 in the core slide 40. Further movement of the mold segments toward each other causes the first cam surface 18 to contact the first cam follower surface 44, which acts as a core extension cam surface to move the core slide 40 in the direction toward the mold cavity 36 to cause the core pin 48 to also move toward the mold cavity, as shown in FIGS. 4 and 5.

Figure 6:
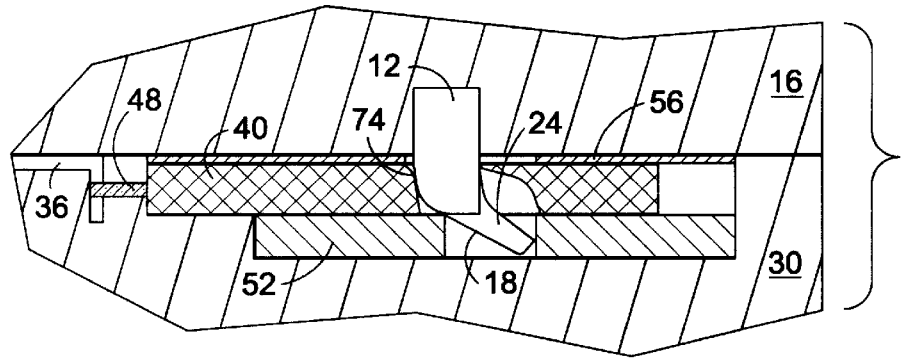

As best seen in FIG. 5, after the first cam surface 18 has moved the core slide 40 toward the mold cavity, the rounded edge 20 of the cam holder 12 then contacts the first cam surface 44 to continue the movement of the core slide 40 toward the mold cavity 36 so that the core pin 48 continues to move into the mold cavity. As the mold reaches a fully closed position, the first cam surface 44 passes the rounded edge 20 of the cam holder 12 and comes into contact with a core locking cam surface 74. When the mold segments 16, 30 are in complete surface-to-surface engagement, as shown in FIG. 6, the cam holder extension 24 is received within the cam-receiving opening 42 formed in the base plate 52, and the core slide 40 is in its fully extended position, relative to the mold cavity, with the core pin 48 extending into mold cavity 36 to the desired depth. With the parts of the device in the positions shown in FIG. 6, the core locking cam surface 74 acts to hold securely the core slide 40 in position so that the mold cavity is in condition to receive molding material, which is typically injected into the mold cavity in liquid form by a suitable injection device (not shown).

Figure 7:
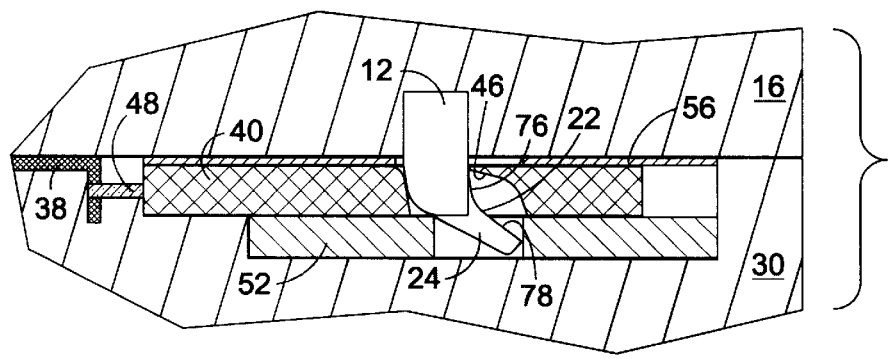
FIGS. 7 through 10 show the mold core positioning device at various positions during a mold opening sequence.
Figure 8:
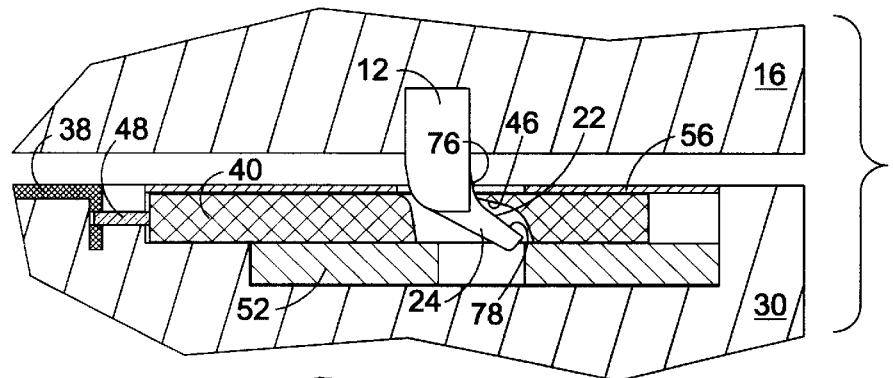
Figure 9:
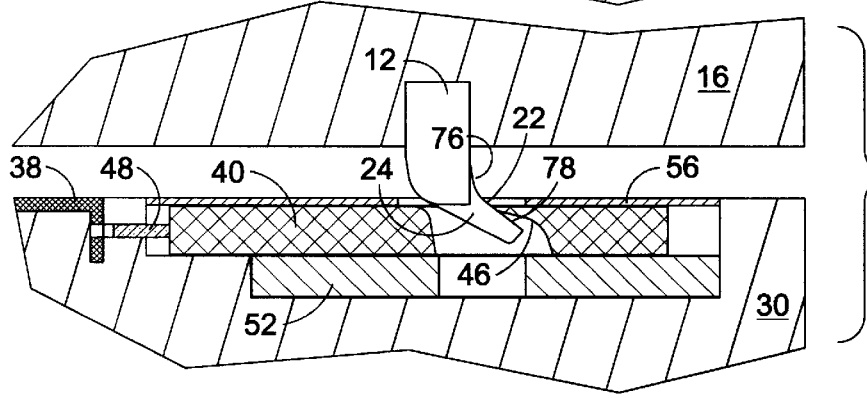
Figure 10:
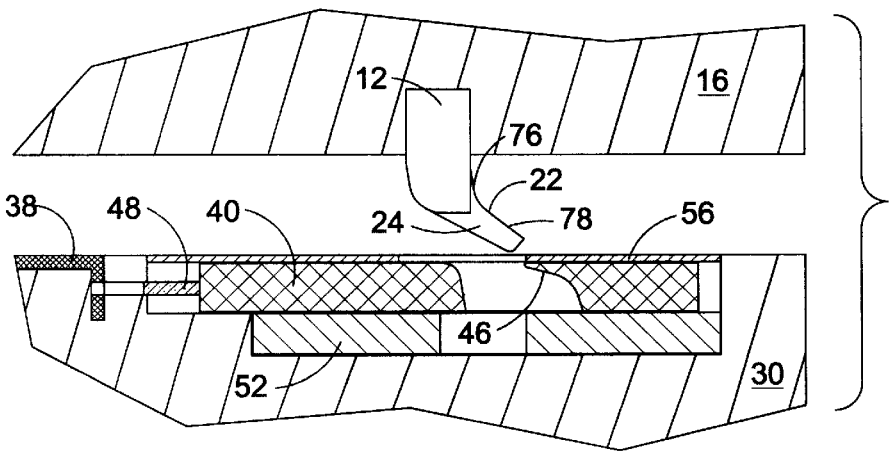

After the mold cavity has been filled with molding material that has solidified, it should be understood that material now surrounds the portion of the core pin 48 that extends into the mold cavity 36, as shown in FIG. 7, so that the part 38 cannot be removed from the cavity 36 until the core pin 48 has been retracted. FIGS. 8, 9, and 10 show the mold segments 16, 30 and the several parts of the mold core positioning device 10 at several intermediate positions during the course of a mold opening sequence. Referring to FIG. 8, as the mold segments 16, 30 begin to move away from each other, the second cam surface 22 comes into contact with the second cam follower surface 46, to initiate retraction of the core slide 40. Additional separation of the mold segments from each other, as shown in FIG. 9, causes the second cam follower surface 46 to pull the core slide 40 and the core pin 48 further from the mold cavity 36, thereby withdrawing the core pin 48 from the molded part. Further movement of the mold segments from each other ultimately results in complete withdrawal of cam holder 12 from the core assembly 26, as shown in FIG. 10. The molded part 38 can then be removed from the mold cavity 36 and the mold closing sequence can be initiated once again in preparation for a subsequent molding cycle.

After the molding material has solidified, it is in contact with and grips a portion of the core pin 48, as shown in FIG. 7. In order to avoid damage to the molded part as the core pin 48 is withdrawn from the molded part, it is desirable that the initial movement of the core pin 48 relative to the molded part 38, to separate the core pin from the molded part, be accomplished very slowly. To effect such slow initial movement, the second cam surface 22 can include a core breakaway cam surface 76 that includes a surface that is at a first acute angle relative to the mold movement direction. The first acute angle is preferably a relatively small acute angle, of the order of from about 80° to about 110°, to cause the initial movement of the core slide 40 in the retraction or withdrawal direction to be very small to effect a slow separation of the core pin 48 from the molded part 38.

Once initial separation of the core pin 48 from the molded part 38 has occurred, further movement of the mold segments from each other causes the core retraction cam surface 78 forming part of second cam surface 22 to move the core slide 40, and the core pin 48, at a more rapid speed until the core pin 48 is fully retracted from the molded part 38 and from the mold cavity 36 to the position shown in FIG. 10. Accordingly, core retraction cam surface 78 defines a second acute angle relative to the mold movement direction that is greater than the first acute angle defined by the core breakaway cam surface 76. Additionally, as shown in the several drawing figures, the transition surface between the core breakaway cam surface 76 and the core retraction cam surface 78 is preferably a curved surface to provide a smooth transition between the two phases of the retraction operation.

Although particular embodiments of the present invention have been illustrated and described, it will be apparent to those skilled in the art that various changes and modification can be made without departing from the concepts of the present invention. It is therefore intended to encompass within the appended claims all such changes and modifications that fall within the scope of the present invention.

What is claimed is:

1. A mold core positioning device, said device comprising:

(a) a cam member adapted to be carried by a first mold segment, the cam member having an extension cam surface and a withdrawal cam surface, the withdrawal cam surface including a breakaway cam surface and a retraction cam surface, wherein the breakaway cam surface is inclined relative to a mold opening and closing movement direction at a first acute angle and the retraction cam surface extends from the breakaway cam surface and is inclined relative to the mold opening and closing movement direction at a second acute angle, and wherein the second acute angle is greater than the first acute angle;

(b) a core slide adapted to be carried by a second mold segment for sliding movement toward and away from a mold cavity defined by the first and second mold segments, a core member supported by the core slide for selective extension into and withdrawal from the mold cavity by the core slide, the core slide having first and second cam follower surfaces configured to engage the extension cam surface and the withdrawal cam surface, respectively;

(c) wherein movement of the mold segments into cooperative engagement causes the extension cam surface to engage the first cam follower surface of the core slide and move the core slide toward the mold cavity, thereby positioning the core member in the mold cavity, and separation of the mold segments results in the breakaway cam surface cooperating with the second cam follower surface, causing the core slide to move away from the mold cavity and withdraw the core member from the mold cavity at a first speed for relatively slow withdrawal of the core member from a molded article without damaging the molded article, after which the retraction cam surface cooperates with the second cam follower surface to withdraw the core member from the mold cavity at a second speed that is greater than the first speed to effect more rapid withdrawal of the core member after initial separation of the core member from the molded article has been accomplished.

2. A mold core positioning device in accordance with claim 1, wherein the cam member includes a cam holder supported by the first mold segment, and a cam that includes the extension and withdrawal cam surfaces.

3. A mold core positioning device in accordance with claim 2, wherein the cam holder includes a slot and the cam is a plate that is received in the slot of the cam member and is held by the cam holder.

4. A mold core positioning device in accordance with claim 1, wherein the core slide includes a cam member aperture.

5. A mold core positioning device in accordance with claim 1, including a base plate underlying the core slide, the base plate including a cam member aperture.

6. A mold core positioning device in accordance with claim 1, wherein the second mold segment includes a core slide recess for supporting and guiding the core member for sliding movement toward and away from the mold cavity, and a core-receiving aperture extends from the core slide recess to the mold cavity for slidably receiving and guiding the core member.

7. A mold core positioning device in accordance with claim 6, wherein the core member is a core pin that defines an opening in the molded article.

8. A mold core positioning device in accordance with claim 1, wherein the core member is a core pin that defines an opening in the molded article.

9. A mold core positioning device in accordance with claim 1, including a core slide cover plate that attaches to the second mold segment, overlies the core slide and includes a cam member opening to allow the cam member to pass through the cover plate and engage the cam follower surfaces of the core slide.

10. A mold core positioning device in accordance with claim 1, wherein the core slide includes a cam holder aperture for receiving the cam holder when the mold segments are in close proximity, and wherein the cam follower surfaces are defined by edges of the cam holder aperture.

11. A mold core positioning device in accordance with claim 1, wherein the extension cam surface of the cam member terminates in a core locking cam surface.

12. A mold comprising:

(a) two mold segments that close together to define a mold cavity and are movable to an open position;

(b) a sliding core contained in one mold segment and movable into and out of the mold cavity in a direction transverse to the opening or closing movement of the mold segments;

(c) a cam surface associated with the sliding core; and (d) a wiper attached to the mold segment not containing the sliding core, the wiper being positioned with respect to the cam surface on the sliding core such that opening of the mold segments causes the wiper to engage the cam surface and move the core transversely out of the mold cavity and closing of the mold segments causes the wiper to engage the cam surface on the sliding core and move the core transversely into the mold cavity;

(e) wherein the cam surface is configured to generate a varying rate of transverse movement for the sliding core as the mold segments open and the wiper travels at a predetermined speed along the cam surface.

* * * * *